(12) United States Patent
Jain et al.

(10) Patent No.: US 10,721,473 B2
(45) Date of Patent: Jul. 21, 2020

(54) SYSTEMS AND METHODS FOR ADJUSTING THE FRAME RATE OF TRANSMITTED VIDEO BASED ON THE LEVEL OF MOTION IN THE VIDEO

(71) Applicant: Honeywell International Inc., Morristown, NJ (US)

(72) Inventors: Abhishek Jain, Bangalore (IN); Amit Grewal, Bangalore (IN); Kamini Kanta Mohanty, Bhubaneswar (IN)

(73) Assignee: Honeywell International Inc., Morris Plains, NJ (US)

( * ) Notice: Subject to any disclaimer, the term of this patent is extended or adjusted under 35 U.S.C. 154(b) by 206 days.

(21) Appl. No.: 15/218,285

(22) Filed: Jul. 25, 2016

(65) Prior Publication Data

US 2018/0027238 A1 Jan. 25, 2018

(51) Int. Cl.
| | |
|---|---|
| *H04N 19/139* | (2014.01) |
| *H04N 19/146* | (2014.01) |
| *H04N 19/177* | (2014.01) |
| *H04N 21/234* | (2011.01) |
| *H04N 5/14* | (2006.01) |
| *H04N 7/18* | (2006.01) |
| *H04N 7/01* | (2006.01) |

(52) U.S. Cl.
CPC ........... *H04N 19/139* (2014.11); *H04N 5/144* (2013.01); *H04N 7/183* (2013.01); *H04N 19/146* (2014.11); *H04N 19/177* (2014.11); *H04N 21/23418* (2013.01); *H04N 7/0127* (2013.01)

(58) Field of Classification Search
CPC ... H04N 19/139; H04N 19/146; H04N 19/177
USPC .................................................. 375/240.26
See application file for complete search history.

(56) References Cited

U.S. PATENT DOCUMENTS

| | | |
|---|---|---|
| 6,005,621 A | 12/1999 | Linzer et al. |
| 6,229,850 B1 | 5/2001 | Linzer et al. |
| 6,529,600 B1 | 3/2003 | Epstein et al. |
| 2003/0107648 A1* | 6/2003 | Stewart ............ G08B 13/19645 348/143 |

(Continued)

FOREIGN PATENT DOCUMENTS

CN 102096924 A 6/2011

OTHER PUBLICATIONS

English-language translation of CN patent application publication 102096924, dated Jun. 15, 2011.

(Continued)

*Primary Examiner* — Nam D Pham
(74) *Attorney, Agent, or Firm* — Seager, Tufte & Wickhem, LLP

(57) ABSTRACT

Systems and methods for adjusting the frame rate of transmitted video based on the level of motion in the video are provided. Some methods can include receiving a video data stream from a video capture device at a first frame rate, identifying a level of motion in one or more frames of the video data stream at a regular interval, identifying a plurality of second frame rates for the video data stream, and transmitting the video data stream to a storage device or a display device at respective ones of the plurality of second frame rates, wherein each of the plurality of second frame rates can correspond to the level of motion in a respective frame of the video data stream.

14 Claims, 3 Drawing Sheets

(56) References Cited

U.S. PATENT DOCUMENTS

| | | | |
|---|---|---|---|
| 2005/0094734 A1* | 5/2005 | Parthasarathy | H04L 25/02 |
| | | | 375/257 |
| 2007/0104462 A1 | 5/2007 | Saito et al. | |
| 2007/0217761 A1 | 9/2007 | Chen et al. | |
| 2009/0087016 A1 | 4/2009 | Berestov et al. | |
| 2011/0018881 A1 | 1/2011 | Nash | |
| 2012/0271104 A1* | 10/2012 | Khait | A61B 1/041 |
| | | | 600/109 |
| 2013/0222671 A1* | 8/2013 | Tseng | H04N 5/23216 |
| | | | 348/333.11 |
| 2014/0355879 A1* | 12/2014 | Agosta | G06K 9/00791 |
| | | | 382/170 |
| 2016/0173805 A1* | 6/2016 | Claus | H04N 17/004 |
| | | | 348/148 |

OTHER PUBLICATIONS

Extended European search report from corresponding EP patent application EP17178513.2, dated Sep. 19, 2017.

* cited by examiner

SYSTEMS AND METHODS FOR ADJUSTING THE FRAME RATE OF TRANSMITTED VIDEO BASED ON THE LEVEL OF MOTION IN THE VIDEO

FIELD

The present invention relates generally to video systems. More particularly, the present invention relates to systems and methods for adjusting the frame rate of transmitted video based on the level of motion in the video.

BACKGROUND

Known video systems in the surveillance industry include a plurality of video sources, encoders, recorders, streamers, cloud server devices, and client devices, such as web applications, mobile applications, desktop applications, and the like. Known video flow includes capturing a scene, then encoding video of the captured scene, and then streaming or recording the encoded video. The video can be transmitted over a plurality of different channels, such as a LAN, a WAN, or the Internet. However, the size of the video data is critical when accessing the video from the Internet, where bandwidth is both limited and valuable.

For example, when streaming or recording video, the challenge always exists to provide adequate and enough details about the captured scene, without providing more or less than is necessary. Indeed, when streaming or recording video of a static scene, providing more or extra frames will not provide any advantages to a user viewing the video. Conversely, when streaming or recording video of a dynamic or high motion scene, providing fewer frames will cause the video to be jerky. Indeed, a user may want to utilize all available bandwidth when a captured scene includes motion so that the user can view each and every movement.

Notwithstanding the above, some known video systems in the surveillance industry are configured with a low and constant frame rate, resulting in jerky video when streaming and recording video of a dynamic or high motion scene, and resulting in missing video details when movements in a dynamic or high motion scene are quick. Conversely, some known video systems in the surveillance industry are configured with a high and constant frame rate, resulting in video that includes more information about a captured scene than is necessary, and resulting in wasted bandwidth and other limited and valuable resources. Indeed, known video systems that are configured with a constant frame rate, such that the same number of frames is streamed in every situation, inefficiently use bandwidth. Furthermore, known video systems that are configured with a constant frame rate, such that the same number of frames is stored in ever situation, inefficiently use storage space, for example, by storing a high number of frames or a high amount of video information, which can include useless information when captured motion is static or low.

FIG. 1 is a view of a timeline 100 of the frame rate of video vs. the level of motion in the video in accordance with known systems and methods. As seen in FIG. 1, in known systems and methods, the frame rate of the streamed and recorded video is constant over time. However, the level of motion in the video changes over time. Accordingly, during non-peak hours, as indicated at 110, when the level of motion in video may be low or a captured scene may be static, bandwidth is often wasted because the video streams and records more details than is necessary. While the constant bandwidth may be appropriate during hours when the level of motion in video is at a medium level, as indicated at 120, during peak hours, as indicated at 130, when the level of motion in video may be high or a captured scene may include crowds or high speed moving objects, the available bandwidth is often not sufficient to stream and record all of the details in the captured scene. Accordingly, many details may be lost by the video captured during peak hours.

In view of the above, there is a continuing, ongoing need for improved systems and methods.

DETAILED DESCRIPTION

Figure 1:
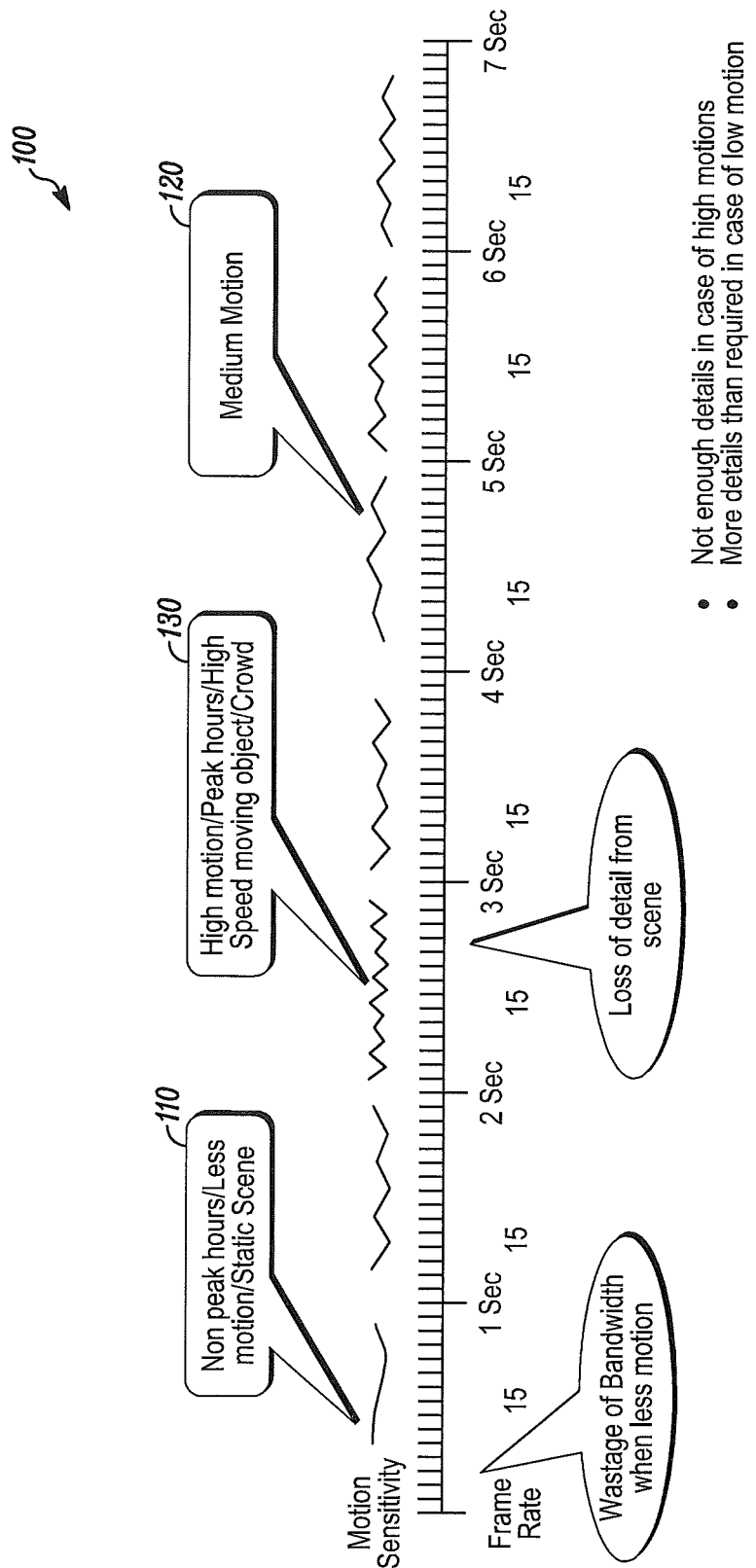
FIG. 1 is a view of a timeline of the frame rate of video vs. the level of motion in the video in accordance with known systems and methods.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for adjusting the frame rate of transmitted video based on the level of motion in the video. For example, in some embodiments, systems and methods disclosed herein can identify or determine the motion sensitivity level in video of a captured scene and, based thereon, derive a frame rate for processing the video of the captured scene, for example, transmitting, streaming, rendering, or recording the video. Because the motion sensitivity level in the video can change over time, the frame rate for transmitting, streaming, rendering, and recording the video can be dynamic.

In accordance with disclosed embodiments, systems and methods disclosed herein can receive video from a video source such that the received video can have a frame rate that includes a maximum number of frames per second (fps) that the video source is capable of capturing. Systems and methods can process one or more frames of the received video at a periodic or regular interval, for example, one frame per second, to identify or determine the motion sensitivity level of the scene in the video frame and, based thereon, identify a frame rate for a respective frame. For example, in some embodiments, systems and methods disclosed herein can map the identified motion sensitivity level, or a range thereof, to an fps value, and, in some embodiments, such mapping can be proportional or based on a predetermined configuration. However, even though the frame rate is adaptive, in some embodiments, systems and methods disclosed herein do not require user input to identify or configure the frame rate for a frame of the received video as the respective frame is processed.

Once a frame rate is identified in accordance with disclosed embodiments, systems and methods disclosed herein can consume or process the video at the identified frame rate for transmitting, streaming, rendering, or recording the video. Because the frame rate can be dynamic and change from frame to frame in the video, systems and methods disclosed herein can utilize bandwidth efficiently so as to not waste bandwidth on unnecessary frames and so as to consume enough bandwidth to transmit, stream, render, or record the appropriate level of detail in the video.

In some embodiments, systems and methods disclosed herein can be used in connection with streaming video via the Internet, when bandwidth efficiency is necessary. Indeed, streaming video over the Internet presents a challenge due to limited and expensive bandwidth, and systems and methods disclosed herein can utilize the appropriate and necessary amount of bandwidth (no more and no less) for the level of motion in the video, rather than consuming a constant bandwidth and wasting or underutilizing available bandwidth. For example, when scenes that include a high level of motion are captured, systems and methods disclosed herein can be used to track every movement, but can avoid losing movement because of a constant bandwidth that is too low for the level of motion. Similarly, when scenes that are static or include no or a low level of motion, systems and methods disclosed herein can be used to transmit the necessary information, but can avoid transmitting useless video data or frames that do not include additional information.

In some embodiments, systems and methods disclosed herein can be used in connection with saving and recording video and can optimize system resources, such as processing power and memory space, by processing, encoding, decoding, compressing, and saving the appropriate and necessary number of frames (no more and no less) for the level of motion in the video. Similarly, when video clips are created, archived, and exported, systems and methods disclosed herein can optimize system resources by creating, archiving, and exporting video clips with the appropriate and necessary number of frames (no more and no less) for the level of motion in the video.

In some embodiments, systems and methods disclosed herein can be used in connection with a variable group of pictures (GOP). For example, systems and methods disclosed herein can identify a GOP value based on the level of motion in associated video. When the level of motion is zero or low, the GOP value can be high, and when the level of motion is high, the GOP value can be low.

In some embodiments, systems and methods disclosed herein can be used in connection with PTZ cameras. For example, systems and methods disclosed herein can dynamically identify a frame rate to be used in connection with PTZ operations such that the frame rate is based on the level of motion in video captured by a PTZ camera. Furthermore, systems and methods disclosed herein can dynamically identify a frame rate to be used in connection with PTZ operations such that the frame rate is based on the speed of a PTZ camera, for example, the PTZ camera speed identified in a PTZ command.

In some embodiments, systems and methods disclosed herein can be used in connection with uncompressed or unencoded video to identify an adaptive frame rate of the video. Accordingly, systems and methods disclosed herein can be used in connection with video systems independently of a codec used therein.

Figure 2:
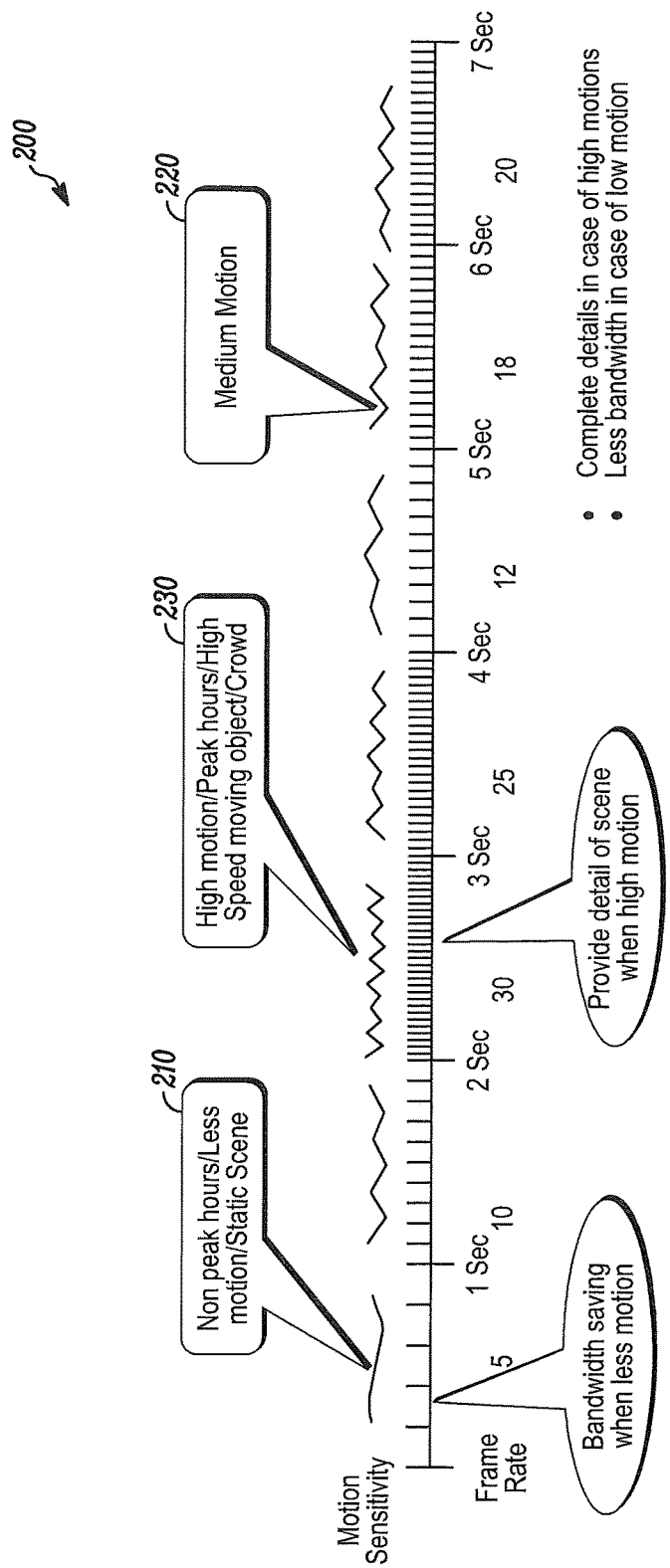
FIG. 2 is a view of a timeline of the frame rate of video vs. the level of motion in the video in accordance with disclosed embodiments.

FIG. 2 is a view of a timeline 200 of the frame rate of video vs. the level of motion in the video in accordance with disclosed embodiments. As seen in FIG. 2, and in accordance with disclosed embodiments, the frame rate of the captured, streamed, transmitted, and recorded video can change over time and be adaptive to the level of motion in the video over time. For example, during non-peak hours, as indicated at 210, when the level of motion in video may be low or a captured scene may be static, bandwidth can be saved or conserved and less bandwidth can be used to stream, transmit, render, and record the video. For example, video can be streamed, transmitted, rendered, and recorded at a frame rate of 5 fps during non-peak hours. More bandwidth can be used during hours when the level of motion in video is at a medium level, as indicated at 220. For example, during hours when the level of motion in video is at a medium level, video can be streamed, transmitted, rendered, and recorded at a rate of 18 fps. However, during peak hours, as indicated at 230, when the level of motion in video may be high or a captured scene may include crowds or high speed moving objects, more bandwidth can be consumed and used to stream, transmit, render, and record the video so that all of the details in the captured scene are shown in the video. For example, video can be stream, transmitted, rendered, and recorded at a rate of 30 fps during peak hours.

Figure 3:
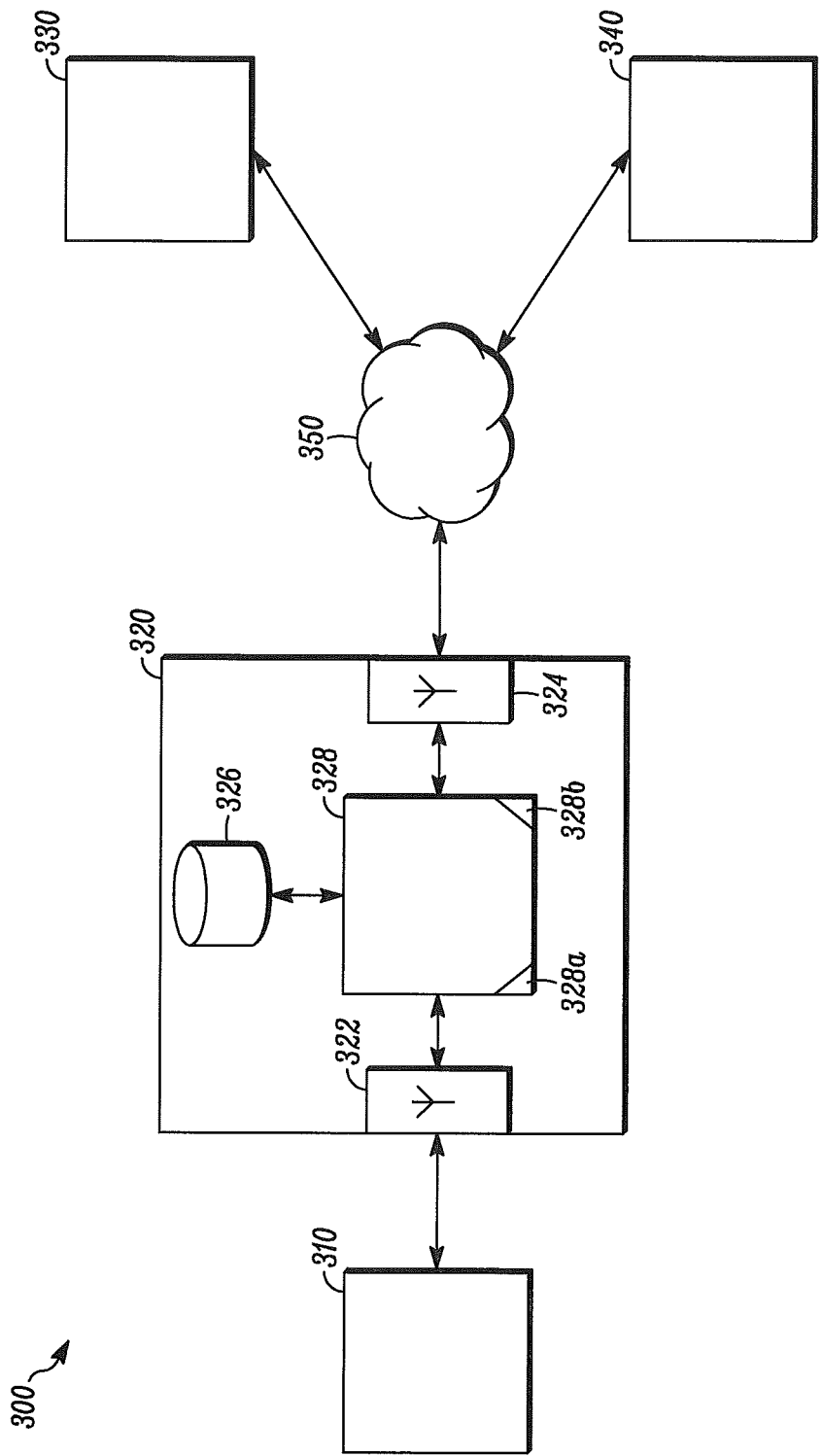
FIG. 3 is a block diagram of a system for adjusting the frame rate of transmitted video based on the level of motion in the video in accordance with disclosed embodiments.

FIG. 3 is a block diagram of a system 300 for adjusting the frame rate of transmitted video based on the level of motion in the video in accordance with disclosed embodiments. As seen in FIG. 3, the system 300 can include a video source 310, a video processing device 320, a storage device 330, and a client device 340. The video source 310 can capture a video data stream of a scene in a monitored region at a frame rate that includes a maximum number of frames per second (fps) that the video source 310 is capable of capturing. The video source 310 can transmit the captured video data stream to the video processing device 320, which can process the video in accordance with methods described above and herein and transmit the processed video to one or both of the storage device 330 and the client device 340, via a network 350, which can include, for example, the Internet, a LAN, or a WAN.

As seen in FIG. 3, the video processing device 320 can include first and second transceiver devices 322, 324 and a memory device 326, each of which can be in communication with control circuitry 328, one or more programmable processors 328*a*, and executable control software 328*b* as would be understood by one of ordinary skill in the art. The executable control software 328*b* can be stored on a transitory or non-transitory computer readable medium, including, but not limited to, local computer memory, RAM, optical storage media, magnetic storage media, flash memory, and the like. In some embodiments, the control circuitry 328, programmable processor 328*a*, and control software 328*b* can execute and control at least some of the methods described above and herein.

For example, in some embodiments, the transceiver device 322 can receive the video data stream captured by the video source 310, and the control circuitry 328, programmable processor 328*a*, and control software 328*b* can analyze the received video data stream to identify and determine the motion sensitivity level in one or more frames of the video data stream at a periodic or regular interval, for example, one frame per second, and, based thereon, identify a frame rate for a respective frame. In some embodiments, the memory device 326 can store a map of motion sensitivity levels, or ranges thereof, to fps values, and the control circuitry 328, programmable processor 328*a*, and control software 328*b* can access the map in the memory device 326 to identify a frame rate for a frame based on the identified motion sensitivity level of the respective frame. Furthermore, in some embodiments, the control circuitry 328, programmable processor 328*a*, and control software 328*b* can compress the video data stream in accordance with the identified frame rate for a respective video frame, and the transceiver device 324 can transmit, to the storage device 330 or the client device 340, the video data stream at the identified frame rates for the respective frames of the video data stream.

Although a few embodiments have been described in detail above, other modifications are possible. For example, the logic flows described above do not require the particular order described, or sequential order, to achieve desirable results. Other steps may be provided, or steps may be eliminated, from the described flows, and other components may be added to, or removed from, the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
   a video processing device receiving a video data stream from a video capture device at a first frame rate;
   the video processing device repeatedly identifying a respective one of a plurality of levels of motion for the video data stream at a motion identifying rate that is less than the first frame rate;
   the video processing device identifying one of a plurality of second frame rates for the video data stream, including accessing a predetermined map that maps the respective one of the plurality of levels of motion in the video data stream to a respective one of the plurality of second frame rates,
   wherein each of the plurality of second frame rates correspond to a respective one of the plurality of identified levels of motion of the video data stream; and
   the video processing device transmitting the video data stream to a storage device or a display device in accordance with the plurality of second frame rates.

2. The method of claim 1 wherein the motion identifying rate is less than half that of the first frame rate.

3. The method of claim 2 wherein the video processing device transmitting the video data stream to the storage device or the display device at the respective ones of the plurality of second frame rates avoids transmission of one or more frames of the video data stream that do not include motion.

4. The method of claim 1 wherein the respective one of the plurality of second frame rates is set lower than the first frame rate when the respective one of the plurality of levels of motion indicates no motion in the video data stream.

5. The method of claim 1 further comprising the video processing device optimizing bandwidth consumed when transmitting the video data stream, wherein optimization is based at least in part on the respective one of the plurality of levels of motion that are associated with the video data stream.

6. The method of claim 2, wherein the first frame rate is greater than 25 frames per second, and the motion identifying rate is less than 5 frames per second.

7. The method of claim 6, wherein the first frame rate is 30 frames per second, and the motion identifying rate is 1 frame per second or less.

8. The method of claim 1, wherein each of the plurality of second frame rates are based at least in part on a current available bandwidth when transmitting the video data stream to the storage device or the display device.

9. A system comprising:
   a video processing device; and
   a video capture device,
   wherein the video processing device receives a video data stream from the video capture device at a first frame rate,
   wherein the video processing device repeatedly identifies a respective level of motion parameter for the video data stream at a motion identifying rate that is less than the first frame rate,
   wherein the video processing device references a motion level-to-fps value map to identify a plurality of second frame rates for the video data stream based at least in part on the respective level of the motion parameters identified for the video data stream,
   wherein each of the plurality of second frame rates is based at least in part on a respective one of the identified level of the motion parameters of the video data stream, and
   wherein the video processing device transmits the video data stream to a storage device or a display device in accordance with the plurality of second frame rates.

10. The system of claim 9 wherein the motion identifying rate is less than half that of the first frame rate.

11. The system of claim 10 wherein the video processing device transmitting the video data stream to the storage device or the display device at the second frame rates avoids transmission of one or more frames of the video data that do not include motion.

12. The system of claim 9 wherein the second frame rate is lower than the first frame rate when the respective level of the motion parameter indicates no motion in the video data stream.

13. The system of claim 9 wherein the video processing device optimizes bandwidth consumed when transmitting the video data stream by basing each of the plurality of second frame rates at least in part on the respective level of the motion parameters that are associated with the video data stream.

14. The method of claim 13, wherein each of the plurality of second frame rates are based at least in part on a current available bandwidth when transmitting the video data stream to the storage device or the display device.

* * * * *